United States Patent Office 3,489,519
Patented Jan. 13, 1970

3,489,519
METHOD FOR THE QUALITATIVE IDENTIFICATION OF NATURAL RUBBER, POLYISOPRENE RUBBER AND MIXTURES OF BOTH
Panagiotis L. Panagoulias, Elmhurst, Mich., assignor to the United States of America as represented by the Secretary of the Army
No Drawing. Filed Mar. 2, 1967, Ser. No. 621,110
Int. Cl. G01n 33/44
U.S. Cl. 23—230                                11 Claims

ABSTRACT OF THE DISCLOSURE

A distinguishing method for the qualitative identification of natural rubber, polyisoprene rubber or a mixture of both comprising the steps of: catalytically reacting a test sample with zinc acetate and glacial acetic acid; adding phenylhydrazine to said reacted test sample; and treating the reaction product of the prior step with an electrophile; said method yielding a distinguishing and specific colored solution when said test sample contains natural rubber, polyisoprene rubber or a mixture of both.

The invention described herein may be manufactured and used by or for the government for governmental purposes without the payment to be of any royalty thereon or therefor.

The present invention relates to a method of qualitatively identifying natural rubber and polyisoprene rubber individually or as a mixture of both under all conditions of occurrence. More particularly, the invention relates to a catalytic techniques which produces distinct color identifications of the above two polymeric elastomers or their mixture.

In the past, pyrolytic methods have been utilized for the qualitative identification of polymers, however, the supposedly identifying color-producing attributes of these methods were never adequately specific to permit positive characterization of individual elastomers occurring as mixtures or compounds of a variety of elastomers. This was particularly true in the case of natural rubber and polyisoprene rubber wherein the only structural distinction between the elastomer compounds lies in the relative position of the double bond within the molecule chain. The pyrolytic methods of the prior art were capable of identifying the presence of natural rubber or polyisoprene rubber or a mixture thereof, but were never capable of distinguishing which of the two polymers was present or if there was an actual mixture of the two. The present invention supplies a method which, by catalytic reactions, indicates and distinguishes between the presence of natural rubber, polyisoprene rubber or a mixture of both. This is accomplished by producing a characteristic and specifically distinct color identification which permits the analyst to detect the presence of one or both of the polymers and to determine which of the two is present.

It is therefore an object of the present invention to provide a method for the individual qualitative identification of natural rubber, polyisoprene rubber of mixtures of both, in a mixture with other polymers and under all of occurrence.

The following description will make other objects and advantages obvious to those skilled in the qualitative analytical arts.

According to the present invention, there is provided a method for the qualitative identification of natural rubber, polyisoprene rubber or mixtures of both in a compound or mixture of compounds.

More particularly, the invention provides a method for the qualitative identification of the above described compounds and their combination which method consists of a catalytic reaction of mixtures or compounds of the above elastomers with glacial acetic acid and zinc acetate, preferably anhydrous, so as to produce a shifting of the double bond within the molecule. Subsequently, such modified molecules are reacted with a hydrazine, and finally with an electrophile, to yield specific solutions of double salts whose color provides a definite and distinguishing identification for the presence of a particular elastomer, chosen from the group consisting of natural rubber, polyisoprene rubber and a mixture of both, present alone or as a compound or mixture with other elastomers. According to the method, each polymer is identified by using a specific procedure eliminating the interference of other polymers or mixtures of polymers and then a specific color producing reaction is initiated to qualitatively identify the elastomer or elastomers which are present.

From the sample of polymeric material which is to be tested, a 5 g. piece is taken and cut into small pieces. These small pieces are then Soxhlet extracted with acetone for a period of from 8–10 hours, according to ASTM Procedure D–297, to remove all traces of vulcanization. Since this step is primarily precautionary, it may be included or excluded depending upon the nature of the sample under study.

The sample is then dried at room temperature, 2 g. thereof placed in a test tube with 60 ml. of 2,2,4-trimethylpentane, and the mixture refluxed for 2–3 hours in order to insure proper solution. Any suitable solvent may be substituted for that specified. Thirty ml. of 99% pure glacial acetic acid and 1 g. of zinc acetate, preferably anhydrous, are then added to the mixture and the complete solution refluxed for another 3–4 hours in order to insure reaction completion. The tube and its contents are then removed from the heating means and cooled at room temperature allowing the precipitate which has been formed to settle. The clear solution is transferred to another test tube, 3 drops of a suitable hydrazine, according to the preferred embodiment phenylhydrazine, added from a 4/10 mm. capillary tube, the contents shaken and the mixture again refluxed for 3–4 hours once again for purposes of assuring reaction completion.

The apperance of a reddish-yellow color of high brilliance is indicative of the presence of polyisoprene rubber alone. The apperance of a cloudy medium yellowish-red in color indicates the presence of a mixture of polyisoprene and natural rubber, and the appearance of a slightly cloudy amber color indicates the presence of natural rubber alone. It is thus possible to determine when either natural rubber alone, polyisoprene alone, or a mixture of both are present as a mixture or compound with other elastomers.

In the presence of polyisoprene or natural rubber, the zinc acetate reacts additively with the double bond of the polymer molecule. The zinc portion and one acetate radical of the zinc acetate molecule attach themselves via the zinc atom to that doubly bonded carbon atom which, due to the presence of a lesser number of hydrogen atoms and the attached electron repelling methyl group, possesses a negative polarity, while the second acetate radical of the zinc acetate attaches itself to the other doubly bonded carbon atom which, due to the presence of a larger number of hydrogen atoms, possesses a positive polarity. In brief, the zinc and one acetate radical are added to the carbon atom having a methyl group attached, and the other acetate radical ($COOCH_3^-$) is added to the alpha carbon which is richer in hydrogen atoms.

Subsequently, in the presence of the excess glacial acetic acid, the zinc atom and its attached acetate radical combine with an acetate radical of the acid to reform the zinc acetate; a hydrogen atom from the acid attaches itself to the methylated carbon at the position vacated by the zinc and, finally, the acetate radical attached to the alpha carbon combines with a hydrogen on the beta carbon yielding an unsaturation at each of those carbons causing the double bond to reappear in a shifted position therebetween. Thus, the zinc acetate, acting as a catalyst and in concert with the glacial acetic acid and the electron repelling methyl ($CH_3$) group, will induce a shift of the double bond to the left or to the right of the methyl group in either natural or synthetic polyisoprene rubber. The mechanisms of the bond shifting for both natural rubber and synthetic polyisoprene rubber are indicated in the diagram below.

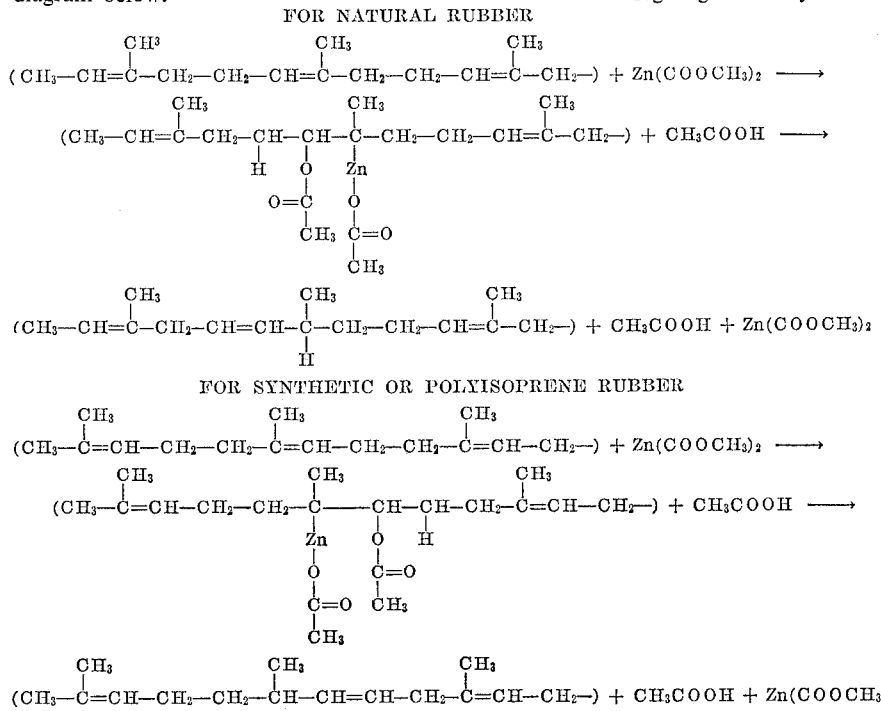

The phenylhydrazine reacts additively with the shifted double bond and then with the glacial acetic acid to form a halochromic amide product with the zinc acetate, when the metallic salt is added to the vacant partial valence existing at the oxygen atom of the carbonyl group. When this partial valence of the carbonyl oxygen is saturated by the zinc acetate, the valence bond between the oxygen and the carbon of the carbonyl weakens, thus imparting some degree of unsaturation to the carbonyl carbon. The formation of such a partially unsaturated carbon is the cause of the so called "Halochromic" effect which produces the indicating colors. The reaction product is commonly designated a double salt.

The above reaction is represented graphically as follows:

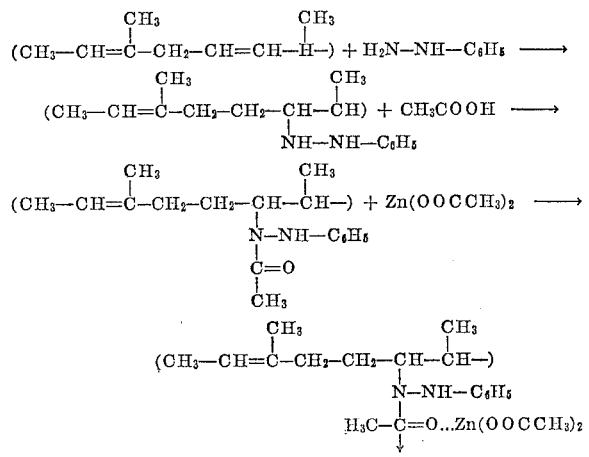

wherein the dotted line indicates a partial valence, and the arrow indicates the affinity of the carbon caused by the partial unsaturation due to the attraction of the zinc of the zinc acetate for the oxygen of the carbonyl.

Any suitable electrophile may be substituted for the zinc acetate which saturates the partial valence of the carbonyl oxygen in the above-described reaction. Two examples of such alternate substitute electrophiles and their methods of utilization are presented below.

In the initial alternative two reagent solutions are prepared. The first of these solutions is prepared by dissolving 2 g. of finely cut uncured acrylonitrile polymers in 70 ml. of 2,2,4-trimethylpentane by refluxing for a two hour period.

The second reagent solution is prepared by adding gradually and at room temperature 1 ml. of bromine to 60 ml. of chemically pure xylene. A reaction occurs which causes the bromine color to vanish. One atom of the bromine molecule ($Br_2$) replaces one hydrogen atom of the xylene and forms bromoxylene. The hydrogen atom which is replaced with the bromine atom reacts with the other atom of the bromine molecule and forms hydrogen bromide (HBr) which remains intact in solution.

The actual reagent is produced by transferring six ml. of the acrylonitrile solution to a reaction vessel with 2 ml. of the hydrogen bromide solution and boiling this mixture for a few seconds to insure proper reaction. Subsequently, 5 ml. of the sample solution prepared as described above, i.e., dissolved in 2,2,4-trimethylpentane, reacted with zinc acetate, glacial acetic acid and phenylhydrazine are added to the reagent solution and this mixture boiled for a few seconds. A greenish-brown color indicates polyisoprene rubber; a light brown color indicates a mixture of natural and polyisoprene rubber, and a beigy-tan color indicates natural rubber.

Dry hydrogen halides add onto the very reactive nitriles to produce imino-halides corresponding to the formula (Polypropeneiminobromide)

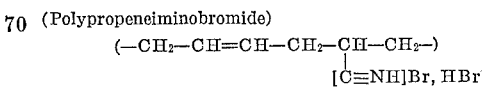

electrophiles which are suitable for saturating the partial valence of the carbonyl oxygen and yielding a specifically colored double-salt of the form

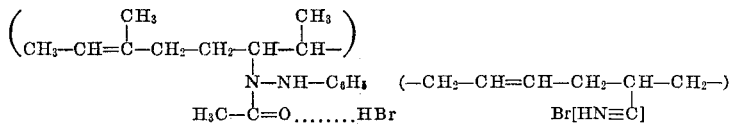

A second alternative preferred embodiment of the invention which provides for the identification of natural rubber under all conditions of occurrence comprises reacting 5 ml. of a sample solution prepared as indicated above with 2 ml. of the hydrogen bromide in bromoxylene reagent prepared as above-indicated. The presence of natural rubber will immediately yield a pink color when the hydrogen bromide saturates the partial valence of the carbonyl oxygen of the halochromic amide product as follows:

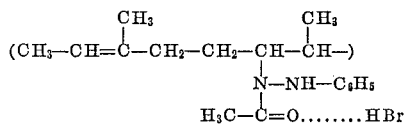

Thus, it is clear that any number of electrophiles may be substituted for the zinc acetate of the originally disclosed embodiment of the invention.

The various indicator colors which appear are dependent upon the particular compounds formed and hence are specific for the elastomers present in the test sample.

What is claimed is:
1. A method for the qualitative identification of natural rubber comprising reacting a test sample with hydrogen bromide in a bromoxylene solvent system.
2. A distinguishing method for the qualitative identification of natural rubber, polyisoprene rubber or a mixture of both comprising the steps of:
  (a) reacting a test sample with zinc acetate and glacial acetic acid; and
  (b) further additively reacting said test sample with phenylhydrazine to produce a characteristic discriminating halochromic and partially unsaturated amide and zinc acetate double salt when said test sample contains natural rubber, polyisoprene rubber or a mixture of both.
3. The method of claim 2 wherein said halochromic amide zinc acetate double salt produces:
  (a) a highly brilliant reddish-yellow color when said test sample contains polyisoprene rubber alone;
  (b) a cloudy yellowish-red color when said test sample contains a mixture of polyisoprene and natural rubber; and
  (c) a slightly cloudy amber color when said test sample contains natural rubber alone.
4. The method of claim 2 wherein said characteristic halochromic partially unsaturated amide - zinc acetate double salt is further reacted with an electrophile to provide a corroborative test yielding distinguishing distinctly and specifically colored solutions when said test sample contains natural rubber, polyisoprene rubber or a mixture of both.
5. The method of claim 4 wherein said electrophile is selected from the group of electrophiles consisting of zinc acetate, hydrogen bromide and polypropeneiminobromide.
6. The method of claim 4 wherein said electrophile is hydrogen bromide and:
  (a) a greenish-brown color is produced when said test sample contains polyisoprene rubber;
  (b) a light brown color is produced when said test sample contains a mixture of natural and polyisoprene rubber; and
  (c) a beigy-tan color is produced when said test sample contains natural rubber.
7. The method of claim 2 wherein said test sample is dissolved in 2,2,4 trimethylpentane to form a test sample solution prior to reaction according to steps (a) and (b).
8. The method of claim 7 wherein said test sample is extracted with acetone for an 8–10 hour period, according to ASTM Procedure D-297, prior to reaction with said zinc acetate and glacial acetic acid.
9. The method of claim 7 wherein said test sample solution is refluxed for a 2–3 hour period prior to reaction with said zinc acetate and glacial acetic acid.
10. The method of claim 7 wherein said test sample solution is refluxed for a 3–4 hour period subsequent to reaction of said test sample with said zinc acetate and said glacial acetic acid and prior to reaction with said phenylhydrazine.
11. The method of claim 7 wherein said test sample solution is refluxed for a three to four hour period subsequent to reaction of said test sample with said phenylhydrazine.

References Cited

Burchfield, H., Chem. Abstr. 40, 3292$^2$, 1946.
Mano, E. B., Chem. Abstr. 57, 997$f$, 1962.
ASTM Standards on Rubber Products 1957, pp. 132, 133.

JOSEPH SCOVRONEK, Primary Examiner

R. M. REESE, Assistant Examiner